US008144313B2

(12) United States Patent
Numata et al.

(10) Patent No.: US 8,144,313 B2
(45) Date of Patent: Mar. 27, 2012

(54) PAPER SHEET RECOGNIZING METHOD AND APPARATUS

(75) Inventors: Toshio Numata, Hyogo (JP); Shinji Matsuura, Hyogo (JP); Tatsuya Sugano, Hyogo (JP); Takayoshi Yano, Hyogo (JP)

(73) Assignee: Glory Ltd., Himeji-shi (JP)

( * ) Notice: Subject to any disclaimer, the term of this patent is extended or adjusted under 35 U.S.C. 154(b) by 285 days.

(21) Appl. No.: 12/446,853

(22) PCT Filed: Oct. 24, 2006

(86) PCT No.: PCT/JP2006/321592

§ 371 (c)(1),
(2), (4) Date: Apr. 23, 2009

(87) PCT Pub. No.: WO2008/050459

PCT Pub. Date: May 2, 2008

(65) Prior Publication Data

US 2010/0092190 A1 Apr. 15, 2010

(51) Int. Cl.
*G06K 9/74* (2006.01)

(52) U.S. Cl. .......................................................... 356/71

(58) Field of Classification Search ..................... 356/71
See application file for complete search history.

(56) References Cited

U.S. PATENT DOCUMENTS

| | | | | |
|---|---|---|---|---|
| 5,638,496 | A | 6/1997 | Sato | |
| 5,652,802 | A | 7/1997 | Graves et al. | |
| 6,529,269 | B1 * | 3/2003 | Sugata | 356/71 |
| 6,734,953 | B2 * | 5/2004 | Numata | 356/71 |
| 6,774,956 | B2 * | 8/2004 | Ono et al. | 349/39 |
| 7,584,890 | B2 * | 9/2009 | Mazowiesky et al. | 235/454 |
| 2002/0096299 | A1 | 7/2002 | Mukai | |
| 2004/0125358 | A1 * | 7/2004 | Numata | 356/71 |
| 2004/0164248 | A1 * | 8/2004 | Nago et al. | 250/341.7 |
| 2005/0053183 | A1 | 3/2005 | Abe et al. | |
| 2005/0108165 | A1 | 5/2005 | Jones et al. | |

FOREIGN PATENT DOCUMENTS

| | | | |
|---|---|---|---|
| EP | 0 605 259 | A2 | 7/1994 |
| EP | 1 049 055 | A2 | 11/2000 |
| JP | 61-110283 | A | 5/1986 |
| JP | 7-162677 | A | 6/1995 |
| JP | 8-180239 | A | 7/1996 |
| JP | 2001-101472 | A | 4/2001 |
| JP | 2001-357429 | A | 12/2001 |
| JP | 2003-178348 | A | 6/2003 |
| JP | 2006-512668 | A | 4/2006 |
| JP | 3812858 | B2 | 6/2006 |
| WO | WO 03/049050 | A1 | 6/2003 |
| WO | WO 2004/061784 | A1 | 7/2004 |

* cited by examiner

*Primary Examiner* — Layla Lauchman
(74) *Attorney, Agent, or Firm* — Foley & Lardner LLP

(57) ABSTRACT

The present invention provides a paper sheet recognizing apparatus for recognizing paper sheets having different sizes and colors for each type, by using a sensing unit including a line sensor that detects a light quantity of reflected light or transmitted light obtained by irradiating a paper sheet being transported with a plurality of lights having different source wavelengths. The apparatus includes a storing unit that stores therein reference size data and reference light quantity data generated beforehand for each type of paper sheets to be recognition candidates; a first determining unit that selects a recognition target type from the recognition candidates based on detected size data of the paper sheet detected by the sensing unit and the reference size data; and a second determining unit that determines a type of the paper sheet by comparing detected light quantity data of the paper sheet detected by the line sensor with the reference light quantity data of the recognition target type.

12 Claims, 11 Drawing Sheets

FIG.7

| FOUR WAVELENGTHS | 5 EU | 10 EU | 20 EU | 50 EU | 100 EU | 200 EU | 500 EU | DETERMINATION RESULT OF EACH LIGHT |
|---|---|---|---|---|---|---|---|---|
| TRANSMITTED INFRARED LIGHT | 5 | 8 | 8 | 0 | 0 | 0 | 0 | DETERMINE AS 20 EURO |
| REFLECTED RED LIGHT | 8 | 13 | 0 | 0 | 0 | 0 | 0 | DETERMINE AS 10 EURO |
| REFLECTED BLUE LIGHT | 3 | 10 | 6 | 0 | 0 | 0 | 0 | DETERMINE AS 20 EURO |
| REFLECTED GREEN LIGHT | 6 | 8 | 5 | 0 | 0 | 0 | 0 | DETERMINE AS 20 EURO |
| TOTAL | 22 | 39 | 19 | 0 | 0 | 0 | 0 | |

PAPER SHEET RECOGNIZING METHOD AND APPARATUS

TECHNICAL FIELD

The present invention relates to a method and apparatus for recognizing type and authenticity of paper sheets such as bills, revenue stamps, and securities. More particularly, the present invention relates to a method and apparatus for recognizing denomination and authenticity of paper sheets without performing pattern recognition, which takes a long time for processing, at the time of recognizing the paper sheets having different colors for each type.

BACKGROUND ART

A paper sheet recognizing apparatus that collectively receives paper sheets (bills or the like) of different types (denominations or the like) in a hopper, feeds and carries the paper sheets into the apparatus one by one, recognizes the type (denomination in the case of notes), and counts and displays the number of sheets per type (amount per denomination) and the total number of sheets (total amount) has been heretofore known (for example, see Japanese Patent Application Laid-open No. 2003-178348).

This type of paper sheet recognizing apparatus includes an recognizing unit that detects an ink pattern or a magnetic pattern of the paper sheets, forms coded data based on light or magnetism detected by the recognizing unit, and checks the coded data by comparing the coded data with reference data prepared in advance, thereby recognizing the type and authenticity of the paper sheets (for example, see Japanese Patent Application Laid-open No. 2001-101472, Japanese Patent Application Laid-open No. 2001-357429, and Japanese Patent No. 3812858).

In the conventional paper sheet recognizing apparatus using such a recognizing method, for example, even at the time of recognizing Euro bills, which have different colors for each denomination and can be easily recognized by human eyes, the ink pattern or the magnetic pattern is detected to perform pattern recognition.

However, the pattern recognition takes a lot of time because it requires processing for forming coded data based on the detected light or magnetism. If a high-performance CPU or the like is provided in the recognizing unit of the paper sheet recognizing apparatus, the processing can be performed at high speed. However, this causes an increase in production cost of the paper sheet recognizing apparatus.

Further, for example, at the time of recognizing bills having noticeably different sizes for each type (for each denomination), the processing can be simplified by measuring their sizes. However, when recognizing paper sheets having different colors for each denomination such as Euro bills or dirty paper sheets only by using single color information, the sizes may not be detected accurately.

In view of the above circumstances, an object of the present invention is to provide a paper sheet recognizing method and apparatus, which can increase processing speed at the time of recognizing paper sheets of different sizes and colors for each type, and can recognize types with high accuracy without increasing the cost.

DISCLOSURE OF INVENTION

A paper sheet recognizing method according to an aspect of the present invention recognizes paper sheets having different sizes and colors for each type. The method includes detecting a light quantity of reflected light or transmitted light obtained by irradiating a paper sheet being transported with a plurality of lights having different source wavelengths by using a line sensor; detecting size of the paper sheet by using an optical sensor; storing reference size data and reference light quantity data generated beforehand for each type of paper sheets to be recognition candidates; selecting a recognition target type from the recognition candidates based on detected size data of the paper sheet detected by the optical sensor and the reference size data; and determining a type of the paper sheet by comparing detected light quantity data of the paper sheet detected by the line sensor with the reference light quantity data of the recognition target type.

In the paper sheet recognizing method, in the determining of the light quantity, the paper sheet may be scanned planarly by repeating line detection for a plurality of times with respect to the paper sheet (P) being transported by using the line sensor (LS) arranged along a direction orthogonal to a transport direction. In the selecting, a width of the paper sheet in the direction orthogonal to the transport direction, which is the detected size data obtained by the line sensor, may be compared with a threshold generated beforehand for each type of the paper sheets to be the recognition candidates, to count the number of the line detections in which the width is included in the threshold, and one recognition target type may be selected from the recognition candidates based on a counting result. In the determining, the type of the paper sheet may be specified by comparing the detected light quantity data of the paper sheet with the reference light quantity data of the recognition target type and the reference light quantity data of at least one recognition candidate whose order of size is adjacent to the recognition target type.

In the paper sheet recognizing method, in the detecting of the size, a length of the paper sheet in the transport direction, which is the detected size data obtained by the optical sensor, may be compared with the reference size data, thereby selecting a plurality of candidate types to be counted.

In the paper sheet recognizing method, the plurality of candidate types may include two types.

In the paper sheet recognizing method, in the determining, the detected light quantity data may be encoded to hue, chroma, and brightness to generate three-dimensional data, and the three-dimensional data may be compared with the reference light quantity data, to specify the type of the paper sheet by referring to distribution tendency of color data. In the paper sheet recognizing method, in the determining, the detected light quantity data may be encoded to hue, chroma, and brightness to generate three-dimensional data, two-dimensional data may be calculated by excluding a parameter of the brightness from the three-dimensional data, and the two-dimensional data may be compared with the reference light quantity data, to specify the type of the paper sheet by referring to distribution tendency of color data. In the paper sheet recognizing method, the lights may be at least two kinds selected from a group consisting of red light, green light, blue light, and infrared light.

A paper sheet recognizing apparatus according to an another aspect of the present invention recognizes paper sheets having different sizes and colors for each type. The apparatus includes a line sensor that detects a light quantity of reflected light or transmitted light obtained by irradiating a paper sheet being transported with a plurality of lights having different source wavelengths; an optical sensor that detects sizes of the paper sheet; a storing unit that stores therein reference size data and reference light quantity data generated beforehand for each type of paper sheets to be recognition candidates; a first determining unit that selects a recognition target type from the recognition based on detected size data of the paper sheet detected by the optical sensor and the reference size data; and a second determining unit that determines a type of the paper sheet by comparing detected light quantity data of the paper sheet detected by the line sensor with the reference light quantity data of the recognition target type.

In the paper sheet recognizing apparatus, the line sensor may be arranged along a direction orthogonal to a transport direction, and may have such a configuration as to scan the paper sheet planarly by repeating line detection for a plurality of times with respect to the paper sheet being transported. The first determining unit may compare a width of the paper sheet in the direction orthogonal to the transport direction, which is the detected size data obtained by the line sensor, with a threshold generated beforehand for each type of the paper sheets to be the recognition candidates, to count the number of the line detections in which the width is included in the threshold, and may select recognition target type from the recognition candidates based on a counting result. The second determining unit may select the type of the paper sheet by comparing the detected light quantity data of the paper sheet with the reference light quantity data of the recognition target type and the reference light quantity data of at least one recognition candidate whose order of size is adjacent to the recognition target type.

In the paper sheet recognizing apparatus, the first determining unit may compare a length of the paper sheet in the transport direction, which is the detected size data obtained by the optical sensor, with the reference size data, thereby selecting a plurality of candidate types to be counted.

In the paper sheet recognizing apparatus, the plurality of candidate types may include two types.

In the paper sheet recognizing apparatus, the second determining unit may encode the detected light quantity data to hue, chroma, and brightness to generate three-dimensional data, and may compare the three-dimensional data with the reference light quantity data, to specify the type of the paper sheet by referring to distribution tendency of color data.

In the paper sheet recognizing apparatus, the second determining unit may encode the detected light quantity data to hue, chroma, and brightness to generate three-dimensional data, may calculate two-dimensional data by excluding a parameter of the brightness from the three-dimensional data, and may compare the two-dimensional data with the reference light quantity data, to specify the type of the paper sheet by referring to distribution tendency of color data.

In the paper sheet recognizing apparatus, the lights may be at least two kinds selected from a group consisting of red light, green light, blue light, and infrared light.

According to the paper sheet recognizing method and apparatus of the present invention having the configuration described above, when recognizing the paper sheets of different sizes and colors for each type, two-stage determination is performed. In first determination, an recognition target type is selected from recognition candidates based on detected size data of the paper sheet, and in second determination, detected light quantity data of the paper sheet is compared with reference light quantity data of the recognition candidate selected in the first determination, thereby specifying the type of the paper sheet. Accordingly, because the pattern recognition requiring detection of the ink pattern or the magnetic pattern does not need to be performed, a configuration of the recognizing unit can be simplified, thereby enabling to realize a high-speed recognition process at a low cost, and the recognizing unit can be downsized.

Further, pieces of the reference light quantity data referred to in the second determination are limited to one recognition target type selected in the first determination and a type of the recognition candidates, whose order of size is adjacent to the recognition target type, thereby enabling to reduce the processing time for comparing the data.

Further, by limiting a plurality of candidate types to be counted from recognition candidates in the first determination to two types selected based on a length of the paper sheet in a transport direction, the processing time for counting the detection lines can be reduced. Because size recognition of the paper sheets is performed based on a width and the length of the paper sheet, the size of the paper sheet can be detected highly accurately.

Further, an influence of dirt of the paper sheet can be reduced and the processing speed can be improved, by encoding the detected light quantity data having three wavelengths of red light, green light, and blue light to hue, chroma, and brightness in the second determination to generate three-dimensional data, calculating two-dimensional data by deleting a brightness parameter from the three-dimensional data, and referring to distribution tendency of color data.

BRIEF DESCRIPTION OF DRAWINGS

FIG. 7 is an example of a counting result of the number of detection lines having detected a width included in a threshold in the embodiment of the present invention;

FIG. 8A depicts a calculation result of 20 euros of circulation banknotes, and FIG. 8B depicts a calculation result of 20 euros of banknotes soiled in the market;

BEST MODE(S) FOR CARRYING OUT THE INVENTION

Exemplary embodiments of the present invention will be explained below with reference to the accompanying drawings.

Figure 1:
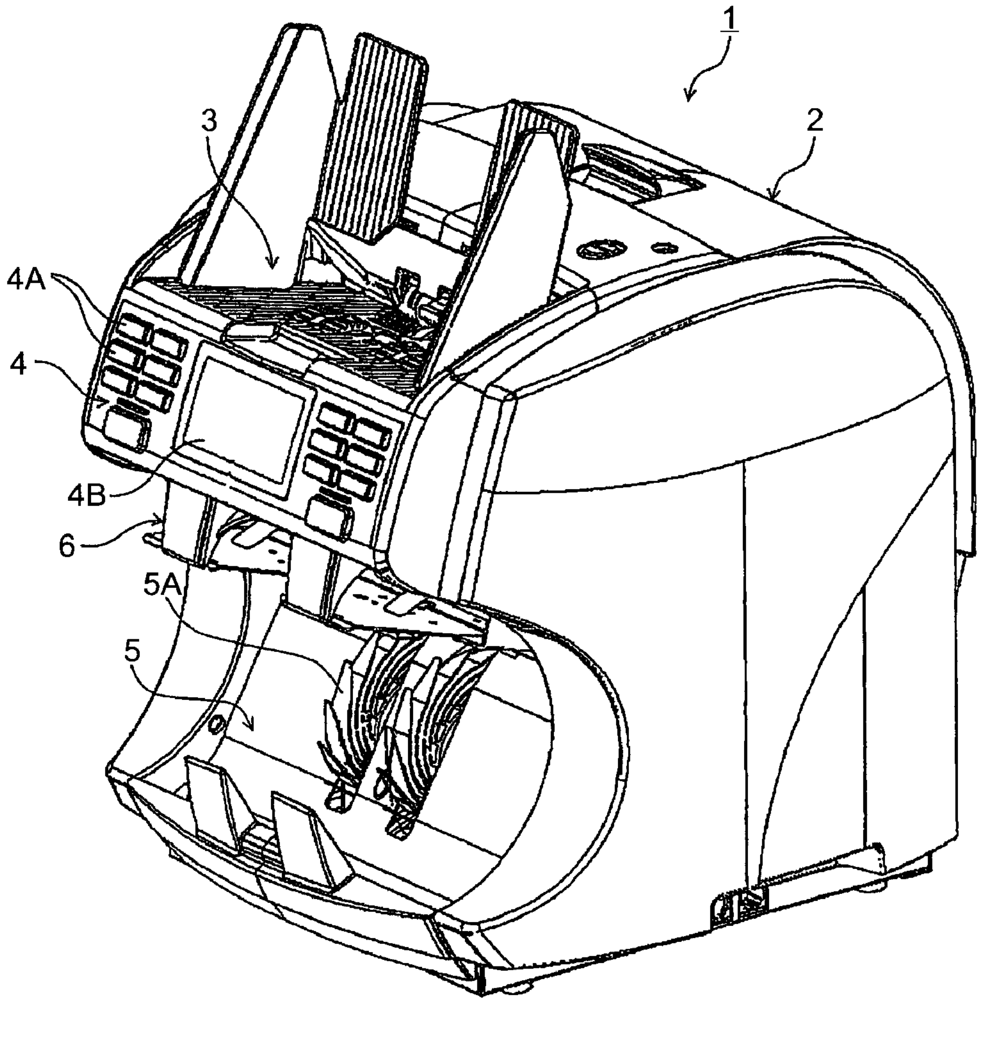
FIG. 1 is an external perspective view of a paper sheet recognizing apparatus according to an embodiment of the present invention.

FIG. 1 is a perspective view of an exterior of a paper sheet counting apparatus according to a first embodiment of the present invention. In FIG. 1, a paper sheet counting apparatus 1 includes a hopper 3, onto which paper sheets such as bills are filled in a stacked state, on an upper front of a casing 2, and an operation display unit 4 that performs various setting at the time of performing a counting and recognizing process of the paper sheets and displays a processing state thereof below the hopper 3 at the front of the casing 2. The operation display unit 4 includes a plurality of operation buttons 4A for performing input of a processing operation, and a crystal display panel 4B for displaying input information by the operation buttons 4A and a counting state, so that a bill recognizing and counting process of, for example, bills of different countries is performed by an input operation of the operation buttons 4A.

The paper sheet counting apparatus 1 also includes a stacker 5, in which the counted paper sheets are aligned and stacked, on a lower front of the casing 2, and a rejecting unit 6 in which paper sheets excluded from a counting target, i.e. paper sheets determined as a different type by a recognizing unit, are stacked, above the stacker 5. A member indicated by reference character 5A is an impeller that catches the paper sheets transported to the stacker 5 to align and stack the bills in the stacker 5.

Figure 2:
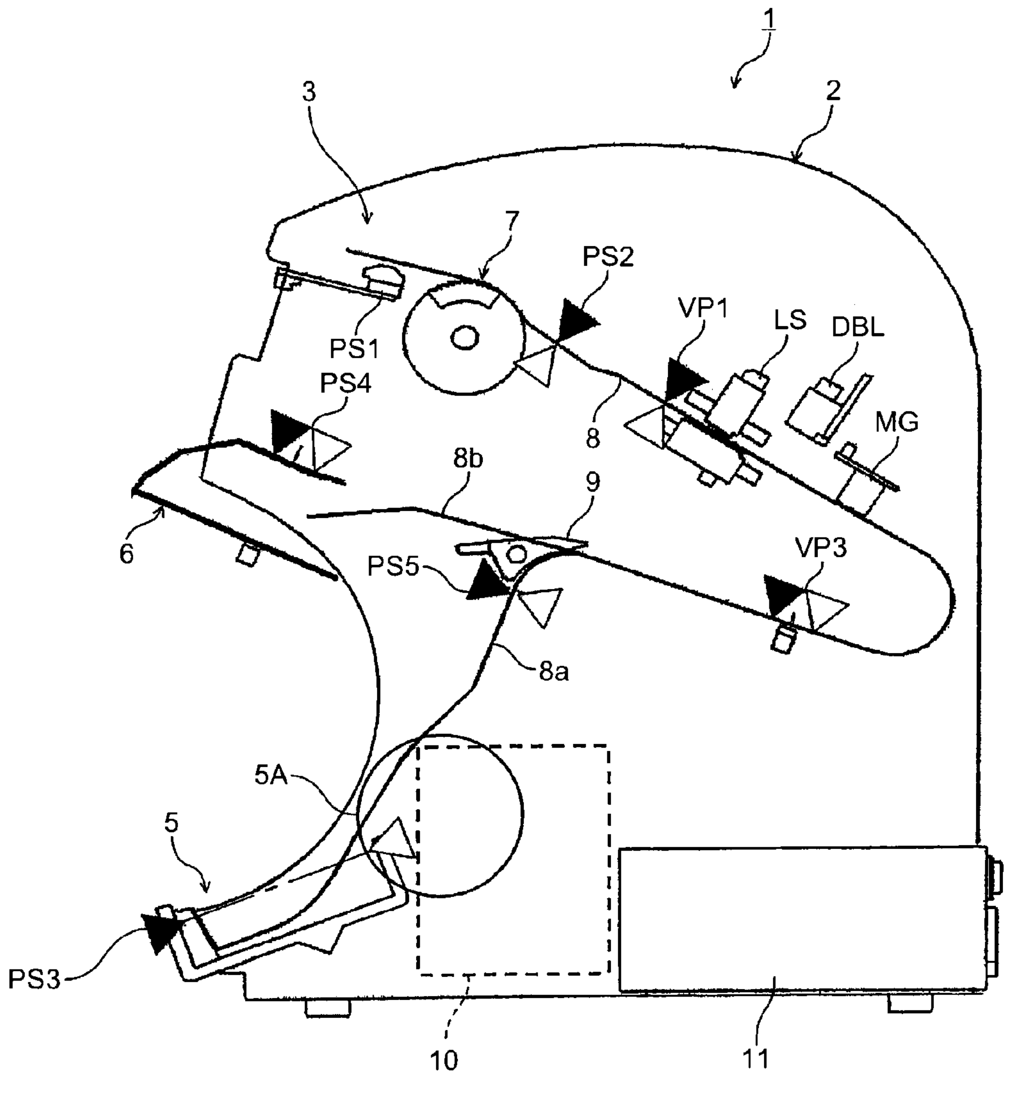
FIG. 2 is a schematic diagram for explaining a feeding and transporting mechanism of the paper sheet recognizing apparatus according to the embodiment of the present invention.

FIG. 2 is an explanatory diagram for schematically depicting a feeding and transporting mechanism of the paper sheet counting apparatus 1 according to an embodiment of the present invention. In FIG. 2, the hopper 3 includes a hopper sensor PS1 that detects the presence of a paper sheet, and a feeding mechanism 7 that sequentially feeds the paper sheet filled in the hopper 3 from the bottom. The feeding mechanism 7 operates in response to a detection signal from the hopper sensor PS1 or an operation of the operation buttons 4A to feed the paper sheets filled in the hopper 3 to a transport path 8 formed inside the paper sheet counting apparatus 1. Power is transmitted to a roller constituting the feeding mechanism 7 via a clutch, so that the roller feeds the paper sheets for a predetermined period, and brakes to prevent follow-up running or double feeding of paper sheets.

Arranged in the transport path 8 are optical sensors PS2 to PS5, VP1, and VP3 including a projector and a photodetector for detecting an abnormal state of the paper sheet to be transported (jamming of paper sheets and the like) and the position of the paper sheet.

The feed control sensor PS2 arranged immediately after (on a downstream side) of the feeding mechanism 7 is used for control of the clutch and a brake in the feeding mechanism 7, and the recognition control sensors VP1 arranged on the downstream of the feed control sensor PS2 are used for detecting a skew degree and others of the paper sheet being transported. Arranged on the downstream of the recognition control sensors VP1 are a line sensor LS and magnetic sensors MG constituting a part of a recognizing part, and a double-feed detection sensor DBL that detects whether plural paper sheets are being fed in a stacked state.

Figure 3:
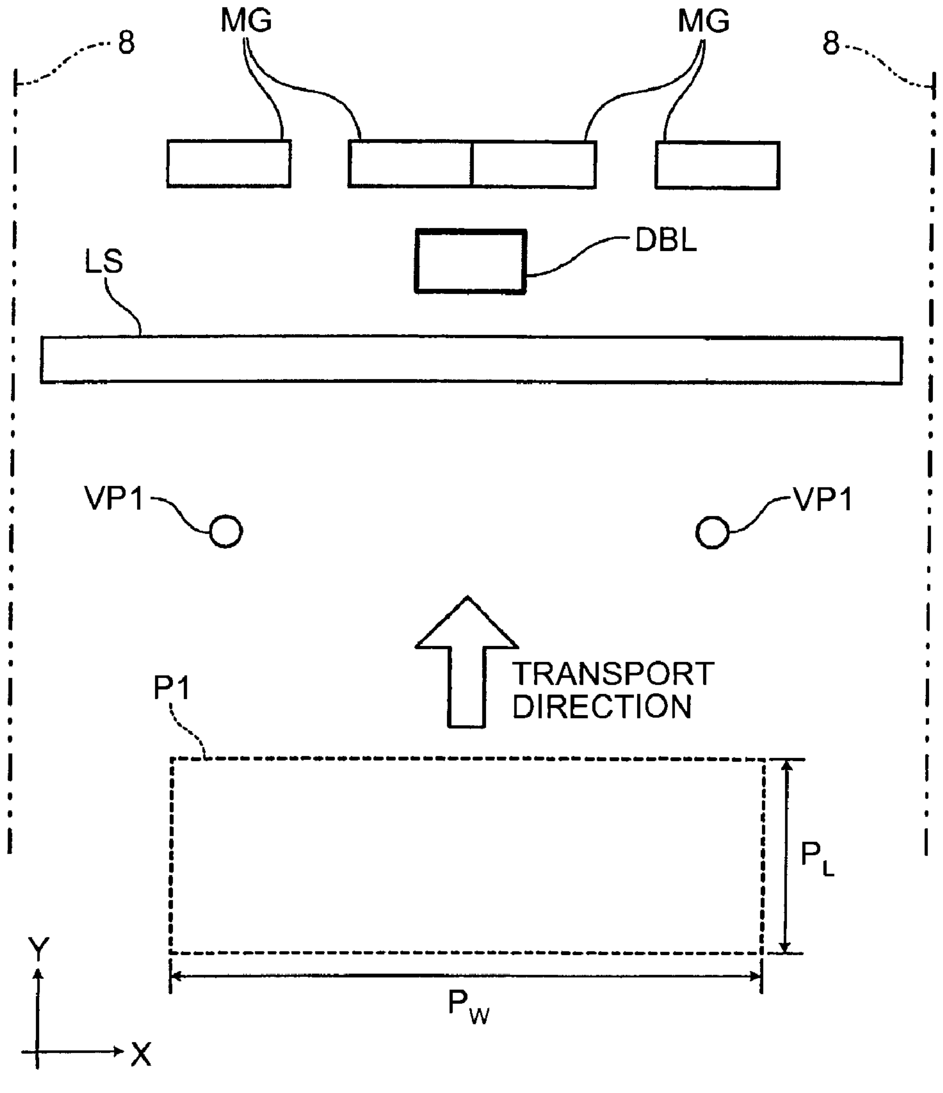
FIG. 3 is a plan view of an arrangement of a recognition sensor in the paper sheet recognizing apparatus according to the embodiment of the present invention.

A planar arrangement of these sensors on the transport path 8 is as shown in FIG. 3. The recognition control sensors VP1 are optical passing sensors and used for detecting a length $P_L$ (size in Y-direction, which is a transport direction) of a passing paper sheet P. The line sensor LS includes a reflective sensor using three visible lights of red light, green light, and blue light and a transmission sensor using infrared light. The line sensor LS scans the passing paper sheet P planarly and detects a physical quantity of reflected light or transmitted light at respective positions on the paper sheet P. The line sensor LS is used for recognizing a type of the paper sheet P and detecting a direction and width $P_W$ (size in X-direction orthogonal to the transport direction). Meanwhile, the magnetic sensors MG are used for recognizing the authenticity of the paper sheet.

The paper sheet having been subjected to recognition and detection by the various sensors described above is dispatched to the rejecting unit 6 or the stacker 5 by a flipper 9 arranged at a point where the transport path 8 is branched to the rejecting unit 6 and the stacker 5. When a front edge of the paper sheet reaches the distribution control sensor VP3, a solenoid is driven to swing the flipper 9, thereby switching the transport path 8 from a main transport path 8*a* (toward the stacker 5) to a branched transport path 8*b* (toward the rejecting unit 6). The paper sheet determined to be normal by the recognizing section (the paper sheet to be recognized as the counting target) is transported through the flipper 9 along the main transport path 8*a*, counted by the passing sensor PS5 of the main transport path, and aligned and stacked in the stacker 5 by the impeller 5A. On the other hand, the paper sheet determined to be a different type or abnormal by the recognizing part (the paper sheet to be excluded from the counting target) is transported along the branched transport path 8*b* to the rejecting unit 6, because the solenoid is operated to swing the flipper 9 as the branching member downward. The presence of the paper sheet in the stacker 5 is detected by the stacker sensor PS3, and the presence of the paper sheet in the rejecting unit 6 is detected by the rejecting unit sensor PS4.

The feeding mechanism of the paper sheet and the impeller 5A are driven by a main motor 10 provided in a lower part of the casing 2. The main motor 10 is stopped when the various sensors described above detect abnormality such as jamming or skewed transport. A power unit 11 that drives the solenoid of the flipper 9, the main motor 10, the various sensors, and a control unit described later is provided also in the lower part of the casing 2.

Figure 4:
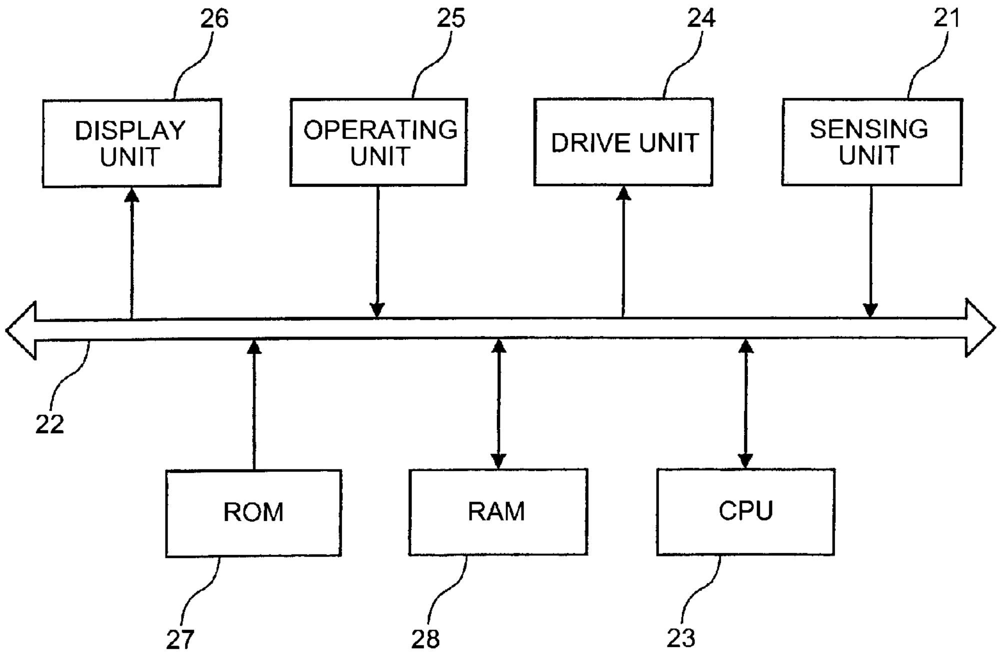
FIG. 4 is a schematic block diagram of a configuration example of the paper sheet recognizing apparatus according to the embodiment of the present invention.

FIG. 4 is a schematic block diagram of a configuration example of a control unit in the paper sheet recognizing apparatus 1 according to an embodiment of the present invention. In FIG. 4, a sensing unit 21 is connected to the line sensor LS, the magnetic sensors MG, the double feed sensor DBL, and the optical sensors PS2 to PS5, VP1, and VP3, converts outputs of the various sensors into signals, and supplies detection signals to a CPU (such as a micro processor) 23 via a bus 22. A drive unit 24 drives the main motor 10, the solenoid of the flipper 9, the clutch, and a brake of the feeding mechanism 7 according to a drive command signal from the CPU 23, to operate the feeding and transporting mechanism. An operating unit 25 includes and operation button 4A provided on an operation display unit 4, and a display unit 26 includes a liquid crystal display panel 4B provided in the operation display unit 4. A ROM 27 and RAM 28 include a predetermined recording medium for storing therein a control program, identification data of the paper sheets, and the like. The RAM 28 is used as a main memory of the CPU 23, and stores therein data, parameters, and the like input from the operating unit 25.

Figure 5:
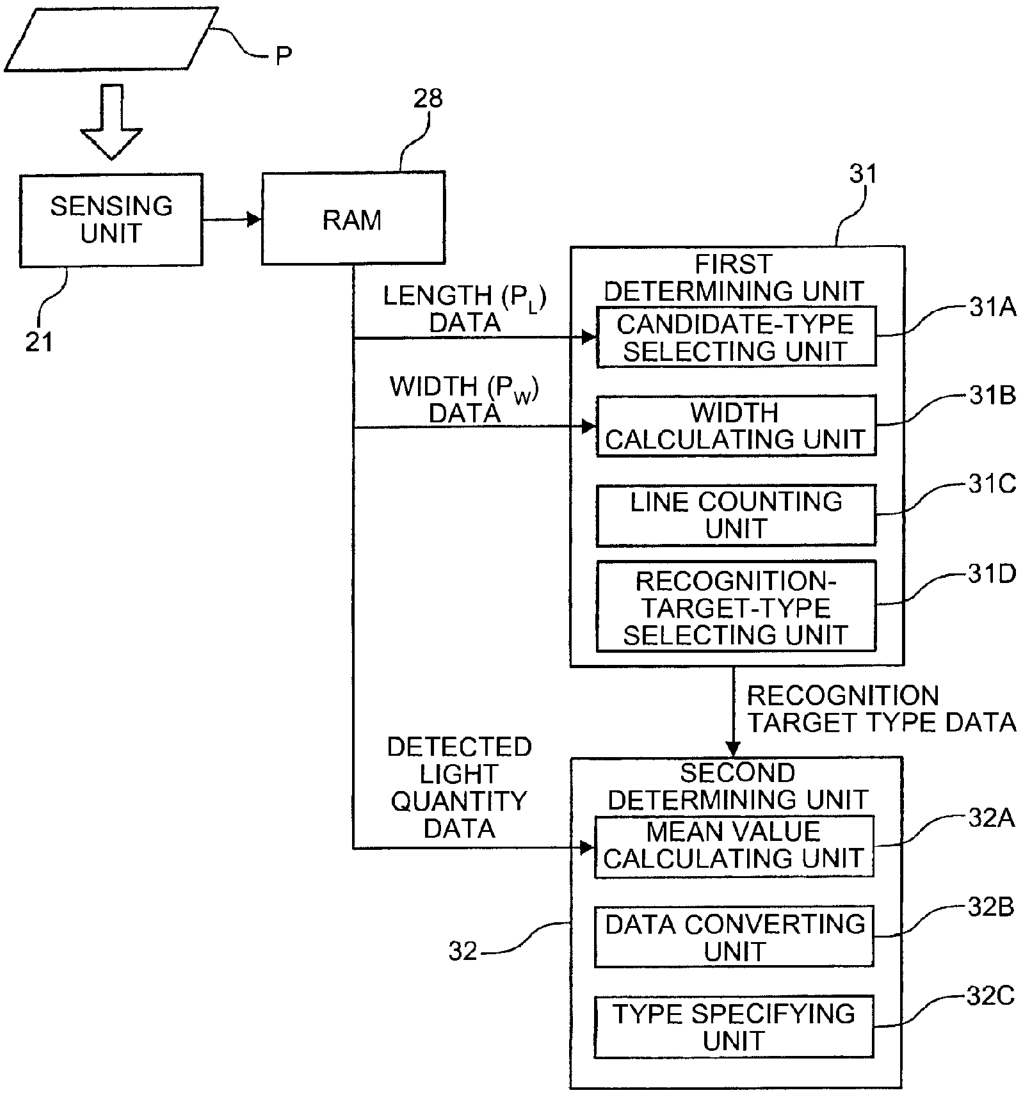
FIG. 5 is a block diagram for schematically explaining a paper sheet recognizing function of the paper sheet recognizing apparatus 1 according to the embodiment of the present invention.

FIG. 5 is a block diagram for schematically explaining a paper sheet recognizing function of the paper sheet recognizing apparatus 1 according to the embodiment of the present invention. In the present embodiment, a paper sheet recognizing process explained below is realized by the CPU system shown in FIG. 4, however, the present invention is not limited thereto.

In FIG. 5, respective pieces of data of paper sheets P detected by the various sensors constituting a part of the sensing unit 21 is A/D converted by the sensing unit 21, and are temporarily stored in the RAM 28. In the present embodiment, length ($P_L$) data of the paper sheets obtained by the recognition control sensor VP1, width ($P_W$) data of the paper sheets obtained by multiplying 4-wavelength light of (reflected red light, reflected green light, reflected blue light, and transmitted infrared light) of the line sensor LS by predetermined number of times (number of line detection with respect to one passing paper sheet), and detected light quantity data obtained by detecting the reflected light of 3-wavelength light (red light, green light, and blue light) of the line sensor LS are used as parameters for recognizing the type of the paper sheets P.

A paper sheet recognizing unit according to the present embodiment is mainly divided to a first determining unit 31 including a candidate-type selecting unit 31 A, a note width calculating unit 31 B, a line counting unit 31 C, and an recognition-target-type selecting unit 31 D, and a second determining unit 32 including a mean value calculating unit 32A, a data converting unit 32B, and a type specifying unit 32C. The first determining unit 31 recognizes the type of the paper sheet based on size information of the paper sheet P, whereas the second determining unit 32 recognizes the type of the paper sheet based on color information of the paper sheet P.

The candidate-type selecting unit 31A compares the length data temporarily stored in the RAM 28 with reference size data generated beforehand for each type of the paper sheets to be recognition candidates and stored in the ROM 27, to select two candidate types.

Figure 6:
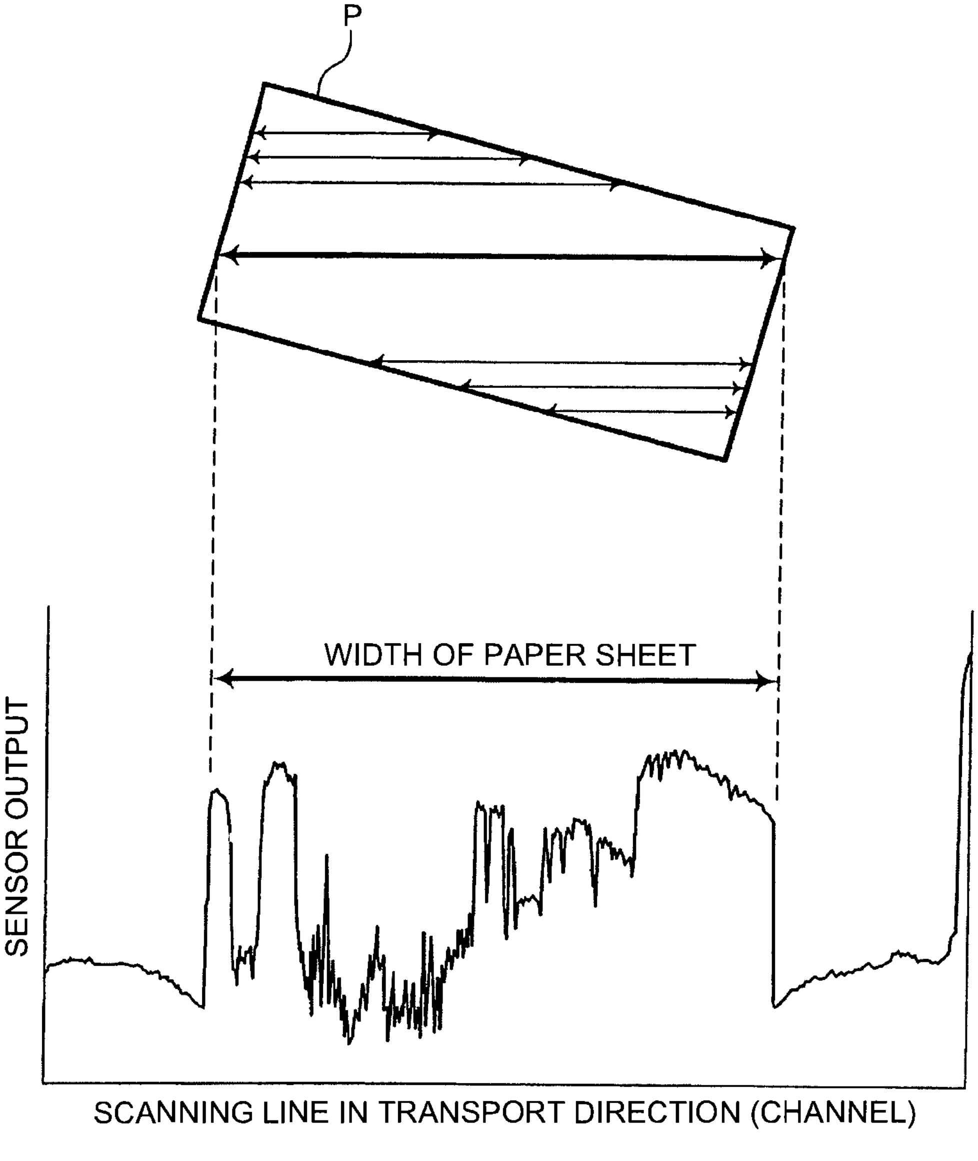
FIG. 6 is an explanatory diagram of calculation of a width of a paper sheet according to the embodiment of the present invention.

The width calculating unit 31B calculates the width obtained per line detection from the width data temporarily stored in the RAM 28. Each width is calculated, as shown in FIG. 6, by extracting an edge of the paper sheet from the data obtained by line detection.

As shown in an example of counting result of Euro bills in FIG. 7, the line counting unit 31C compares the width obtained by the width calculating 31B with a threshold generated beforehand for each type of the paper sheets to be recognition candidates and stored in the ROM 27, to count the number of line detections included in the threshold for each wavelength.

The recognition-target-type selecting unit 31D checks presence of count starting from a larger candidate type (20EU) of the two candidate types (10EU and 20EU) selected by the candidate-type selecting unit 31A based on the counting result obtained by the line counting unit 31C, thereby selecting one recognition target type. In the present embodiment, because there is the detection line counted for 20EU, 20EU is selected as the recognition target type; however, if it is assumed that the detection line counted for 20EU is 0, 10EU is selected as the recognition target type.

Figure 8A:
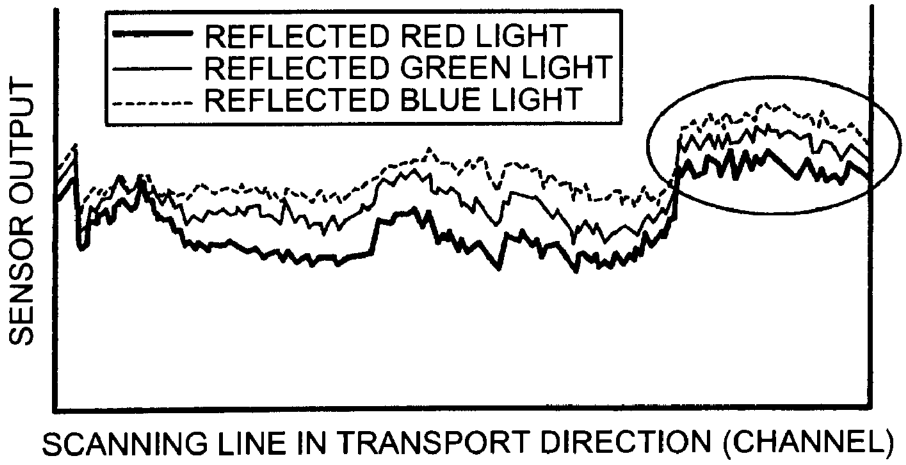
FIGS. 8A and 8B are explanatory diagrams of one example of a specific area of paper sheets according to the embodiment of the present invention, where
Figure 8B:
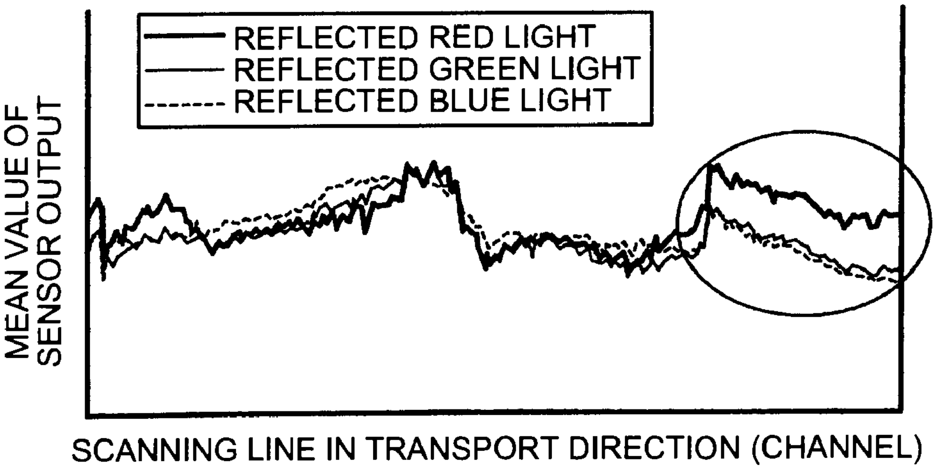

The mean value calculating unit 32A calculates, for each channel provide in the line sensor LS, a mean value of sensor outputs in a specific area set beforehand for each recognition target type from the detected light quantity data of the reflected red light, the reflected green light, and the reflected blue light temporarily stored in the RAM 28. Because each of the paper sheets includes an area in which a feature thereof tends to appear, by setting this area as the specific area, the type of the paper sheet can be recognized without calculating the mean value of the sensor outputs in the whole area of the paper sheets and generating the three-dimensional data. FIG. 8A and 8B are explanatory diagrams of one example of the specific area of the paper sheets, where FIG. 8A depicts a calculation result of 20 euros of circulation banknotes, and FIG. 8B depicts a calculation results of 20 of the banknotes soiled in the market. In these figures, when a graph in FIG. 8A is compared with graph in FIG. 8B, inconsistency of data increases in a part enclosed by an ellipse (a transparent part with a faint color) (strong and weak relation of the sensor outputs is reversed between the reflected red light and the reflected blue light). Accordingly, in the case of recognizing 20 euro bill, it is not preferable to use such a part as the specific area for determination. Therefore, a part with a dark color (a part in which blue is strong in FIGS. 8A and 8B) is used as the specific area for determination.

Figure 9:
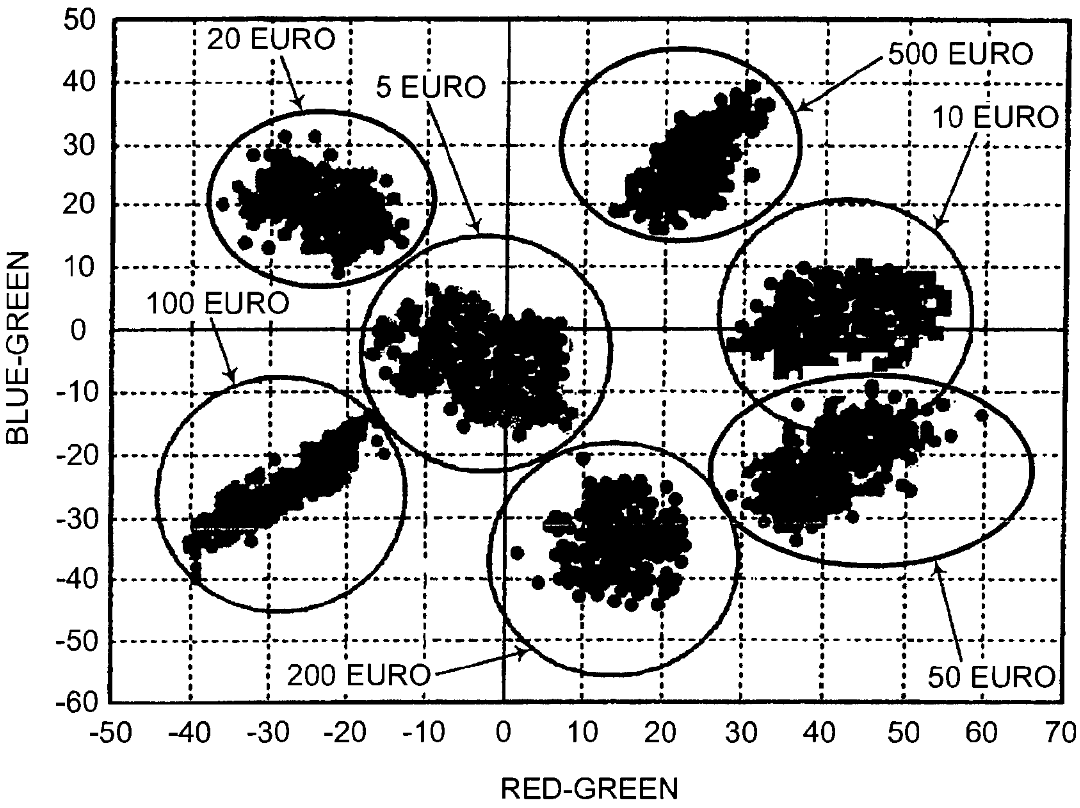
FIG. 9 is a graph of a Grb color system indicating distribution of different denominations of Euro bills as one example of a color system conversion in the embodiment of the present invention.

The data converting unit 32B uses a conversion equation of a Grb color system having a relatively good fractionation rate of color in color digitization, encodes the mean value of the sensor outputs in the specific area obtained by the mean value calculating unit 32A to hue, chroma, and brightness to generate three-dimensional color data, and excludes the brightness parameter from the three-dimensional data to thereby convert the data to two-dimensional color data. FIG. 9 is a graph of the Grb color system indicating distribution of different denominations of Euro bills as one example of the conversion of the color system. Because it is difficult to perform color determination in the three-dimensional data, RGB is simply converted to the two-dimensional data in the graph. Because general brightness can be obtained from equation [red−0.299+green×0.587+blue×0.114], it is seen that the main part of the brightness is indicated by a green component. In the present embodiment, therefore, the three-dimensional data is generated, assuming that brightness (G)=green, r (pigment)=red−green, b (pigment)=blue−green, and distribution is expressed by the data in which the parameter of brightness (G) is excluded from the three-dimensional data.

In the present embodiment, the Grb color system is used for the color digitization; however, the present invention is not limited thereto, and substantially the same effect as that of the Grb color system can be obtained by generating the three-dimensional data by using, for example, an L*a*b color system, to express distribution by data in which the parameter of L* (luminance) is excluded from the three-dimensional data.

Figure 10:
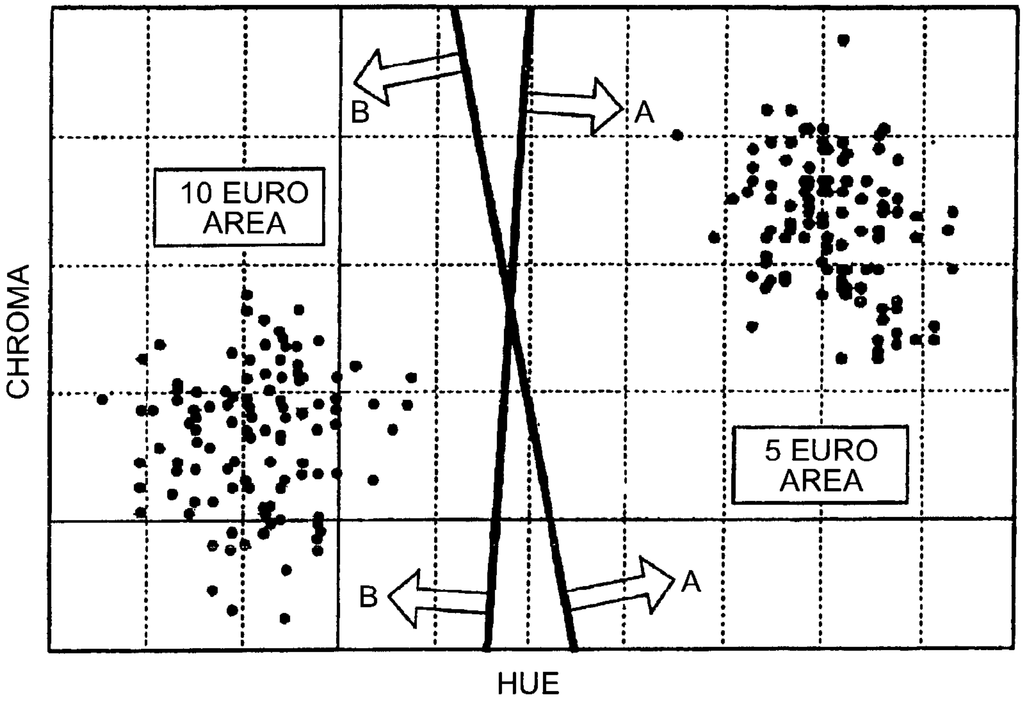
FIG. 10 is a graph of an L*a*b color system indicating distribution of 5 Euro bill and 10 Euro bill as one example of color data distribution in the embodiment of the present invention.

The type specifying unit 32C refers to distribution tendency of color in the reference light quantity data stored in the ROM 27 beforehand, to determine in which type the two-dimensional color data obtained by the data converting unit 32B is included, thereby specifying the type of the paper sheet P. The paper sheets as the recognition target in the present embodiment have different sizes and colors according to type, and particularly, the color is largely different between the recognition target type selected by the first determining unit 31 and the type of the recognition candidates whose order of size is adjacent to the recognition target type, (for example, Euro notes). At the time of referring to the distribution tendency of the color, therefore, the type specifying unit 32C according to the present embodiment compares the recognition target type selected by the first determining unit 31 with the type having the order of size larger by one than the recognition target type from the recognition candidates. FIG. 10 is a graph of the L*a*b color system indicating distribution of 5 Euro bill and 10 Euro bill as one example of color data distribution. In FIG. 10, two thick lines depicted between 5 Euro area and 10 Euro area are thresholds indicating a boundary between the areas. If the color data is distributed on the right side of block arrow A, the paper sheet is determined as 5 Euro bill, and if the color data is distributed on the left side of block arrow B, the paper sheet is determined as 10 Euro bill. In FIG. 10, when the color data is distributed between two thick lines, it is determined that the paper sheet cannot be recognized, and the paper sheet is delivered to the rejecting unit 6 as in the case of a paper sheet of different denomination.

As described above, in the paper sheet recognizing unit according to the present embodiment, the first determining unit 31 narrows the recognition target type down to one type, and when the second determining unit 32 refers to the color distribution tendency, only comparison of the recognition target type with the type having the order of size larger by one than the recognition target type from the recognition candidates is required.

Therefore, the configuration of a determination processing circuit can be simplified, and determination processing speed can be increased.

Figure 11:
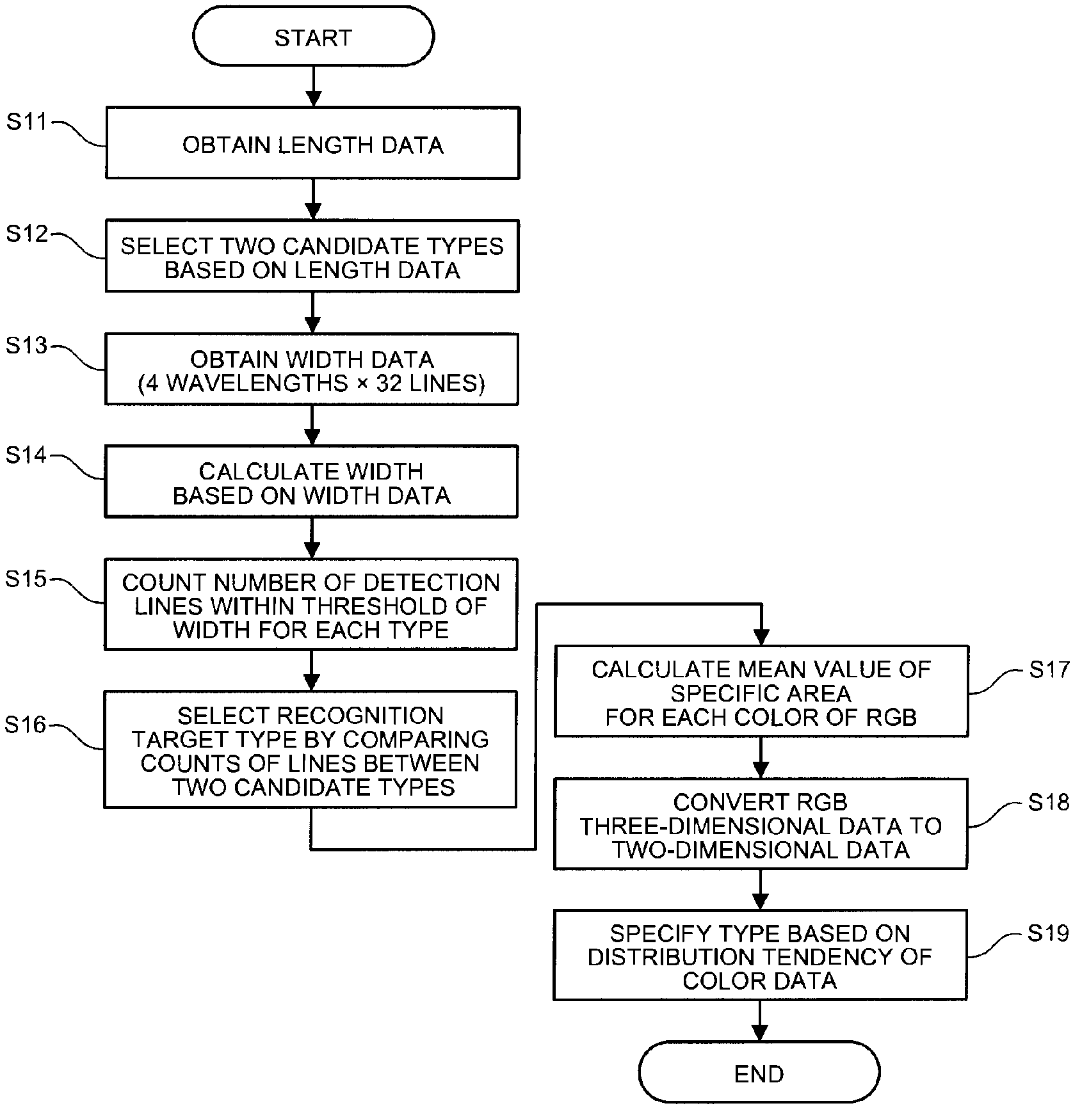
FIG. 11 is a flowchart of a recognizing process example of the paper sheet recognizing apparatus according to the embodiment.

A recognizing process example of the paper sheet recognizing apparatus according to the present embodiment is explained next with reference to a flowchart in FIG. 11.

First, the length data of the paper sheets detected by the recognition control sensor VP1 and temporarily stored in the RAM 28 is obtained (Step S11), and the obtained length data is compared with the reference size data generated beforehand for each type of the paper sheets as the recognition candidates and stored in the ROM 27, to select two candidate types (Step S12).

The width data detected by the line sensor LS and temporarily stored in the RAM 28 is then obtained (Step S13), and the edge of the paper sheet is calculated from the data obtained by line detections of the line sensor LS, to calculate the width obtained per line detection (Step S14).

The number of detection lines having detected the width included in the threshold generated beforehand for each type of the paper sheets as the recognition candidates and stored in the ROM 27 is then counted (Step S15), and the counts of the detection lines included in the threshold of the two candidate types selected at Step S12 are compared with each other, to select one recognition target type (Step S16).

The detected light quantity data of the reflected light of 3-wavelength light (red light, green light, and blue light) detected by the line sensor LS and temporarily stored in the RAM 28 is then obtained to calculate, for each channel provided in the line sensor LS, a mean value of the sensor outputs in the specific area set beforehand for each recognition target type (Step S17). The mean value of the sensor outputs is then encoded to the hue, chroma, and brightness to generate three-dimensional color data, and the parameter of brightness is excluded from the three-dimensional data to convert the data to two-dimensional color data (Step S18). It is determined to which one of the recognition target type and the type having the order of size larger by one than the recognition target type the color distribution tendency belongs, to specify the type of the paper sheet, by referring to the reference light quantity data stored in the ROM 27 beforehand (Step S19).

According to the paper sheet recognizing apparatus 1 according to the present embodiment of the present invention, when the paper sheets having a different size and color according to types are recognized, the first determining unit 31 selects the recognition target type from the recognition candidates based on the detected size data of the paper sheet, and the second determining unit 32 compares the detected light quantity data of the paper sheet with the reference light quantity data of the recognition candidate selected by the first determining unit 31, to specify the type of the paper sheet. Accordingly, because pattern recognition does not need to be performed by detecting the ink pattern or magnetic pattern, the configuration of the recognition processing circuit can be simplified and a high-speed recognizing process can be realized at a low cost, and the recognizing unit can be downsized.

While a specific example of the present invention has been explained above, the invention is not limited thereto, and can be variously modified without departing from the scope of the present invention.

INDUSTRIAL APPLICABILITY

The present invention is applicable to a paper sheet recognizing apparatus that receives paper sheets in a hopper, counts the received number of sheets, and stacks the sheets in a stacker. Particularly, the present invention is useful when high processing speed is to be realized at the time of recognizing paper sheets having a different size and color according to types.

The invention claimed is:

1. A paper sheet recognizing method for recognizing paper sheets having different sizes and colors for each type, the method comprising:

detecting a light quantity of reflected light or transmitted light obtained by irradiating a paper sheet being transported with a plurality of lights having different source wavelengths by using a line sensor;

detecting size of the paper sheet by using an optical sensor;

storing reference size data and reference light quantity data generated beforehand for each type of paper sheets to be recognition candidates;

selecting a recognition target type from the recognition candidates based on detected size data of the paper sheet detected by the optical sensor and the reference size data; and determining a type of the paper sheet by comparing detected light quantity data of the paper sheet detected by the line sensor with the reference light quantity data of the recognition target type and wherein, in the detecting of the light quantity, the paper sheet is scanned planarly by repeating line detection for a plurality of times with respect to the paper sheet being transported by using the line sensor arranged along a direction orthogonal to a transport direction, in the selecting, a width of the paper sheet in the direction orthogonal to the transport direction, which is the detected size data obtained by the line sensor, is compared with a threshold generated beforehand for each type of the paper sheets to be the recognition candidates, to count the number of the line detections in which the width is included in the threshold, and one recognition target type is selected from the recognition candidates based on a counting result, and in the determining, the type of the paper sheet is specified by comparing the detected light quantity data of the paper sheet with the reference light quantity data of the recognition target type and the reference light quantity data of at least one recognition candidate whose order of size is adjacent to the recognition target type.

2. The paper sheet recognizing method according to claim 1, wherein in the detecting of the size, a length of the paper sheet in the transport direction, which is the detected size data obtained by the optical sensor, is compared with the reference size data, thereby selecting a plurality of candidate types to be counted.

3. The paper sheet recognizing method according to claim 2, wherein the plurality of candidate types comprises two types.

4. The paper sheet recognizing method according to claim 1, wherein in the determining, the detected light quantity data is encoded to hue, chroma, and brightness to generate three-dimensional data, and the three-dimensional data is compared with the reference light quantity data, to specify the type of the paper sheet by referring to distribution tendency of color data.

5. The paper sheet recognizing method according to claim 1, wherein in the determining, the detected light quantity data is encoded to hue, chroma, and brightness to generate three-dimensional data, two-dimensional data is calculated by excluding a parameter of the brightness from the three-dimensional data, and the two-dimensional data is compared with the reference light quantity data, to specify the type of the paper sheet by referring to distribution tendency of color data.

6. The paper sheet recognizing method according to claim 1, wherein the lights are at least two kinds selected from a group consisting of red light, green light, blue light, and infrared light.

7. A paper sheet recognizing apparatus for recognizing paper sheets having different sizes and colors for each type, comprising:

a line sensor that detects a light quantity of reflected light or transmitted light obtained by irradiating a paper sheet being transported with a plurality of lights having different source wavelengths;

an optical sensor that detects size of the paper sheet;

a storing unit that stores therein reference size data and reference light quantity data generated beforehand for each type of paper sheets to be recognition candidates;

a first determining unit that selects a recognition target type from the recognition candidates based on detected size data of the paper sheet detected by the optical sensor and the reference size data; and a second determining unit that determines a type of the paper sheet by comparing detected light quantity data of the paper sheet detected by the line sensor with the reference light quantity data of the recognition target type, and wherein, the line sensor is arranged along a direction orthogonal to a transport direction, and has such a configuration as to scan the paper sheet planarly by repeating line detection for a plurality of times with respect to the paper sheet being transported, the first determining unit compares a width of the paper sheet in the direction orthogonal to the transport direction, which is the detected size data obtained by the line sensor, with a threshold generated beforehand for each type of the paper sheets to be the recognition candidates, to count the number of the line detections in which the width is included in the threshold, and selects recognition target type from the recognition candidates based on a counting result, and the second determining unit specifies the type of the paper sheet by comparing the detected light quantity data of the paper sheet with the reference light quantity data of the recognition target type and the reference light quantity data of at least one recognition candidate whose order of size is adjacent to the recognition target type.

8. The paper sheet recognizing apparatus according to claim 7, wherein the first determining unit compares a length of the paper sheet in the transport direction, which is the detected size data obtained by the optical sensor, with the reference size data, thereby selecting a plurality of candidate types to be counted.

9. The paper sheet recognizing apparatus according to claim 8, wherein the plurality of candidate types comprises two types.

10. The paper sheet recognizing apparatus according to claim 7, wherein the second determining unit encodes the detected light quantity data to hue, chroma, and brightness to generate three-dimensional data, and compares the three-dimensional data with the reference light quantity data, to specify the type of the paper sheet by referring to distribution tendency of color data.

11. The paper sheet recognizing apparatus according to claim 7, wherein the second determining unit encodes the detected light quantity data to hue, chroma, and brightness to generate three-dimensional data, calculates two-dimensional data by excluding a parameter of the brightness from the three-dimensional data, and compares the two-dimensional data with the reference light quantity data, to specify the type of the paper sheet by referring to distribution tendency of color data.

12. The paper sheet recognizing apparatus according to claim 7, wherein the lights are at least two kinds selected from a group consisting of red light, green light, blue light, and infrared light.

* * * * *